US009796347B2

(12) United States Patent
Packwood

(10) Patent No.: US 9,796,347 B2
(45) Date of Patent: Oct. 24, 2017

(54) MAINTENANCE OF A MINIMUM VOLTAGE TO EQUIPMENT IN RAIL VEHICLE

(71) Applicant: Union Pacific Railroad Company, Omaha, NE (US)

(72) Inventor: Steve A Packwood, Omaha, NE (US)

(73) Assignee: Union Pacific Railroad Company, Omaha, NE (US)

(*) Notice: Subject to any disclaimer, the term of this patent is extended or adjusted under 35 U.S.C. 154(b) by 839 days.

(21) Appl. No.: 14/148,519

(22) Filed: Jan. 6, 2014

(65) Prior Publication Data
US 2015/0191134 A1 Jul. 9, 2015

(51) Int. Cl.
| B60L 1/00 | (2006.01) |
| B60L 3/00 | (2006.01) |
| H02G 3/00 | (2006.01) |
| B60R 16/03 | (2006.01) |

(52) U.S. Cl.
CPC ........... *B60R 16/03* (2013.01); *B60L 2240/80* (2013.01); *Y10T 307/406* (2015.04)

(58) Field of Classification Search
CPC .... B60L 2240/80; B60L 1/00; B60L 11/1809; B60L 2200/26; B60R 16/03; B60R 1/00; B60R 16/023; Y10T 307/406; B61B 1/00
See application file for complete search history.

(56) References Cited

U.S. PATENT DOCUMENTS

| 4,096,394 | A | * | 6/1978 | Ullmann | ................. | H02J 9/061 |
| | | | | | | 307/46 |
| 5,161,097 | A | * | 11/1992 | Ikeda | ...................... | G05F 1/563 |
| | | | | | | 323/222 |
| 5,365,453 | A | * | 11/1994 | Startup | .............. | G01R 31/3648 |
| | | | | | | 320/136 |
| 5,387,820 | A | * | 2/1995 | Imagawa | ................. | G05F 1/577 |
| | | | | | | 307/31 |
| 5,456,241 | A | * | 10/1995 | Ward | .................... | F02P 3/0892 |
| | | | | | | 123/169 EL |
| 5,506,519 | A | * | 4/1996 | Avery | .............. | H03K 3/356026 |
| | | | | | | 326/95 |
| 5,936,317 | A | * | 8/1999 | Sasanouchi | ........... | H02J 7/0031 |
| | | | | | | 307/10.1 |
| 2004/0145919 | A1 | * | 7/2004 | Hazucha | ................. | H02M 3/07 |
| | | | | | | 363/17 |
| 2005/0254273 | A1 | * | 11/2005 | Soudier | ................. | H02M 3/335 |
| | | | | | | 363/103 |
| 2006/0006850 | A1 | * | 1/2006 | Inoue | .................... | H02J 7/0065 |
| | | | | | | 323/265 |
| 2008/0143301 | A1 | * | 6/2008 | Bartilson | ................. | B60K 6/28 |
| | | | | | | 320/167 |
| 2011/0060281 | A1 | * | 3/2011 | Aeschlimann | .... | A61M 5/14244 |
| | | | | | | 604/151 |

(Continued)

*Primary Examiner* — Rexford Barnie
*Assistant Examiner* — Rasem Mourad
(74) *Attorney, Agent, or Firm* — Roy B. Rhee

(57) ABSTRACT

Herein described is at least a system for generating one or more control signals based on a voltage provided by an energy storage device. Based on the one or more control signals, the system may selectively enable flow of current through one of: a) a first circuitry when the voltage is equal to or greater than a threshold value, and b) a second circuitry when the voltage is less than the threshold value, wherein the flow of the current through the second circuitry upconverts the voltage associated with the current from a first value to a second value.

26 Claims, 4 Drawing Sheets

(56) References Cited

U.S. PATENT DOCUMENTS

| | | | | |
|---|---|---|---|---|
| 2011/0082621 A1* | 4/2011 | Berkobin | ............ | B60L 11/1824 |
| | | | | 701/31.4 |
| 2011/0218729 A1* | 9/2011 | Takahashi | ............... | F02N 11/08 |
| | | | | 701/113 |
| 2014/0012446 A1* | 1/2014 | Kumar | ................ | B60L 11/1801 |
| | | | | 701/22 |

\* cited by examiner

MAINTENANCE OF A MINIMUM VOLTAGE TO EQUIPMENT IN RAIL VEHICLE

BACKGROUND

While starting up or cranking up an engine in a rail vehicle, for example, such as a locomotive, a voltage provided by a battery in the locomotive may momentarily drop below the required value. The momentary drop in voltage may be significant enough to negatively affect the operation of the locomotive.

SUMMARY

In light of the foregoing background, and other shortcomings, the following presents a simplified summary of the present disclosure in order to provide a basic understanding of some aspects described herein. This summary is not an extensive overview, and is not intended to identify key or critical elements or to delineate the scope of the claims. The following summary merely presents various described aspects in a simplified form as a prelude to the more detailed description provided below.

According to some embodiments, a system is described that comprises a first circuitry configured for generating one or more control signals based on a voltage provided by an energy storage device. The system further comprises a second circuitry configured for receiving the one or more control signals and first providing current sourced by the energy storage device through the second circuitry to power one or more devices. The first providing may be performed when the one or more control signals enables the second circuitry. The system further comprises a third circuitry configured for receiving the one or more control signals and upconverting the voltage from a first value to a second value, and second providing the current through the third circuitry to power the one or more devices. The upconverting and the second providing may be performed when the one or more control signals enables the third circuitry. The one or more control signals may be configured to selectively enable one of: a) the second circuitry when the voltage is equal to or greater than a threshold value, and b) the third circuitry when the voltage is less than the threshold value.

According to some embodiments, a method is described for generating one or more control signals by a first circuitry based on a voltage provided by an energy storage device, first receiving a first subset of the one or more control signals by a second circuitry, second receiving a second subset of the one or more control signals by a third circuitry, using the one or more control signals to selectively enable one of: a) the second circuitry when the voltage is equal to or greater than a threshold value, and b) the third circuitry when the voltage is less than the threshold value. The method further describes that enabling the second circuitry allows current associated with the voltage to flow from the energy storage device to one or more devices through the second circuitry. The method further describes that enabling the third circuitry upconverts the voltage from a first value to a second value and allows the current to flow from the energy storage device to the one or more devices through the third circuitry.

According to some embodiments, a system is described that comprises one or more circuitries operable for, at least generating one or more control signals based on a voltage provided by an energy storage device, selectively enabling a flow of current through one of: a) a first circuitry of the one or more circuitries when the voltage is equal to or greater than a threshold value, and b) a second circuitry of the one or more circuitries when the voltage is less than the threshold value, based on the one or more control signals. The flow of the current through the second circuitry upconverts the voltage from a first value to a second value.

The various aspects of the illustrative embodiments are substantially shown in and/or described in connection with at least one of the following figures, as set forth more completely in the claims.

These and other advantages, aspects, and novel features of the present disclosure, as well as details of illustrated embodiments, thereof, will be more fully understood from the following description and drawings.

BRIEF DESCRIPTION OF THE DRAWINGS

Figure 1:
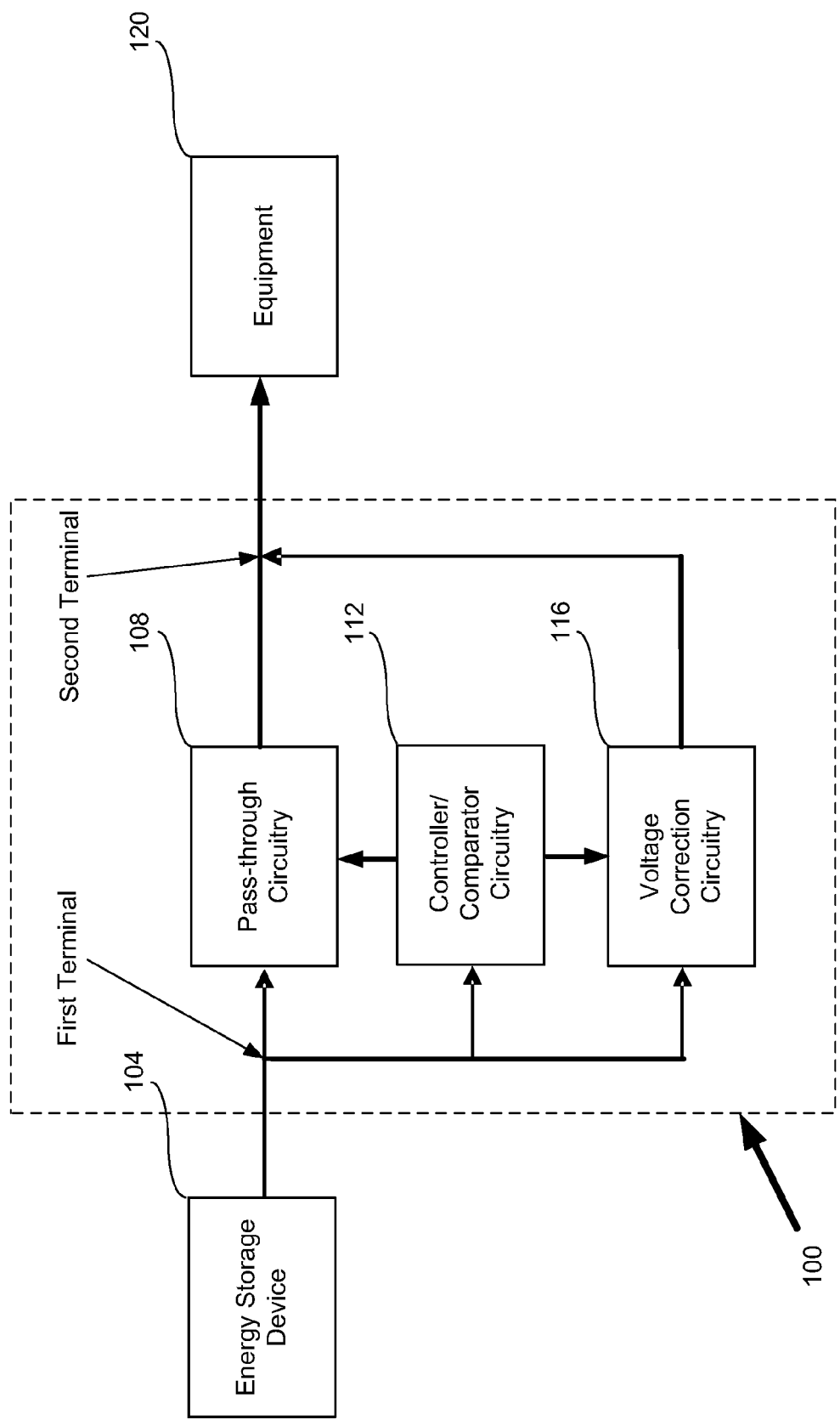

Having thus described aspects of the disclosure in general terms, reference will now be made to the accompanying drawings, which are not necessarily drawn to scale, and wherein:

FIG. 1 illustrates an example system in which various embodiments may be implemented.

Figure 2:
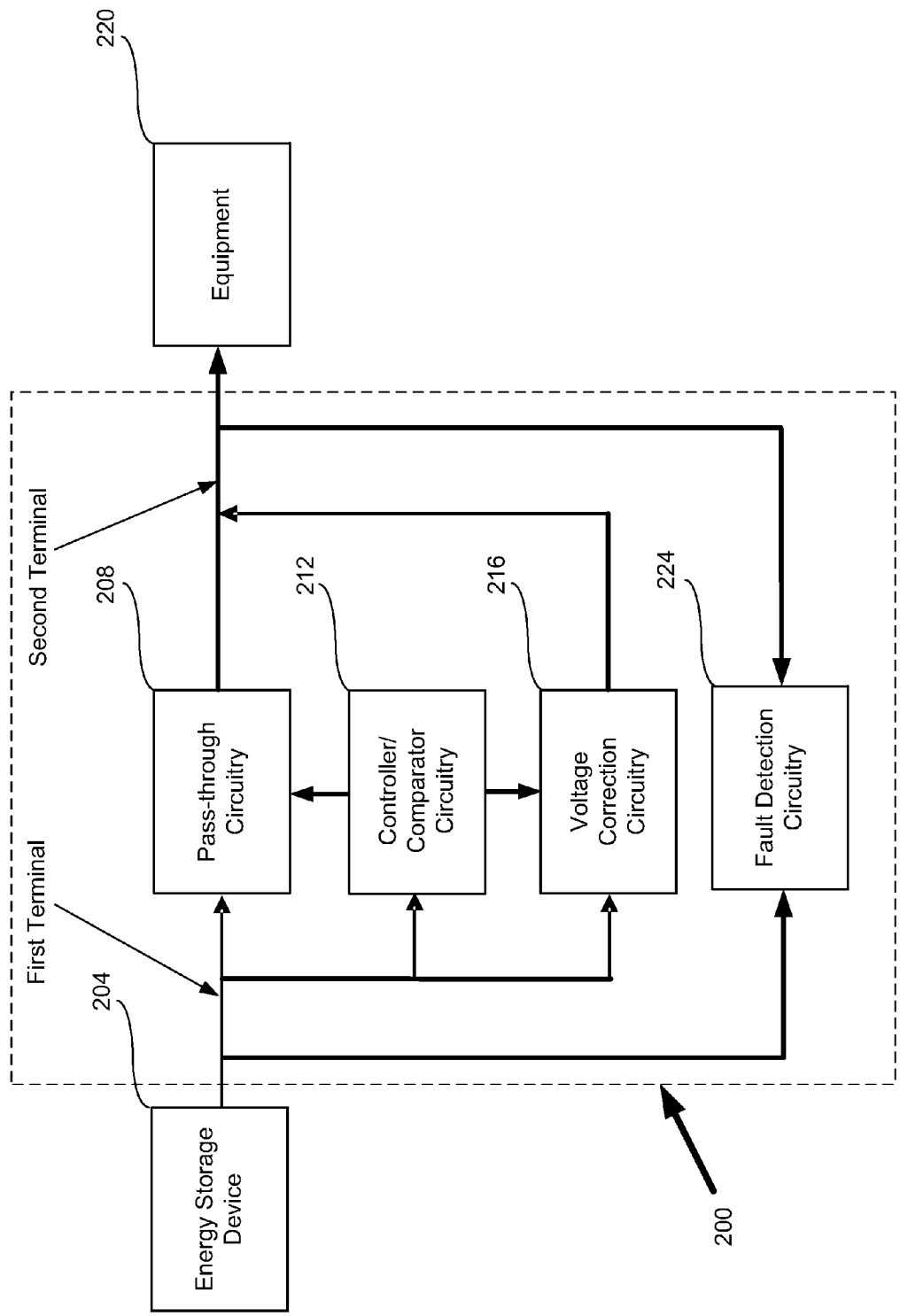

FIG. 2 illustrates an example system in which various embodiments may be implemented.

Figure 3A:
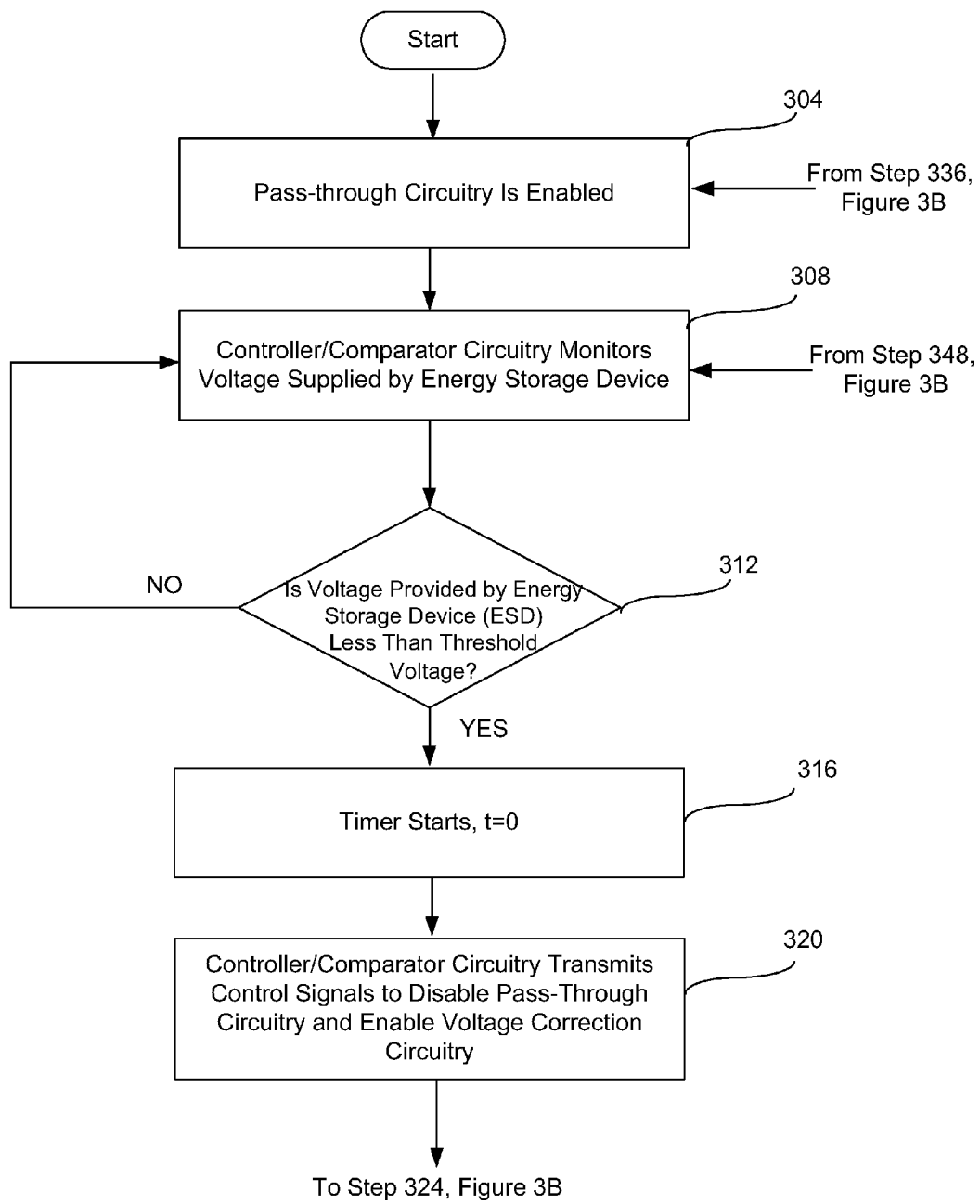

FIG. 3A is example operational flow diagram of a method for monitoring the voltage provided by an energy storage device and for upconverting the voltage delivered to equipment in accordance with various embodiments.

Figure 3B:
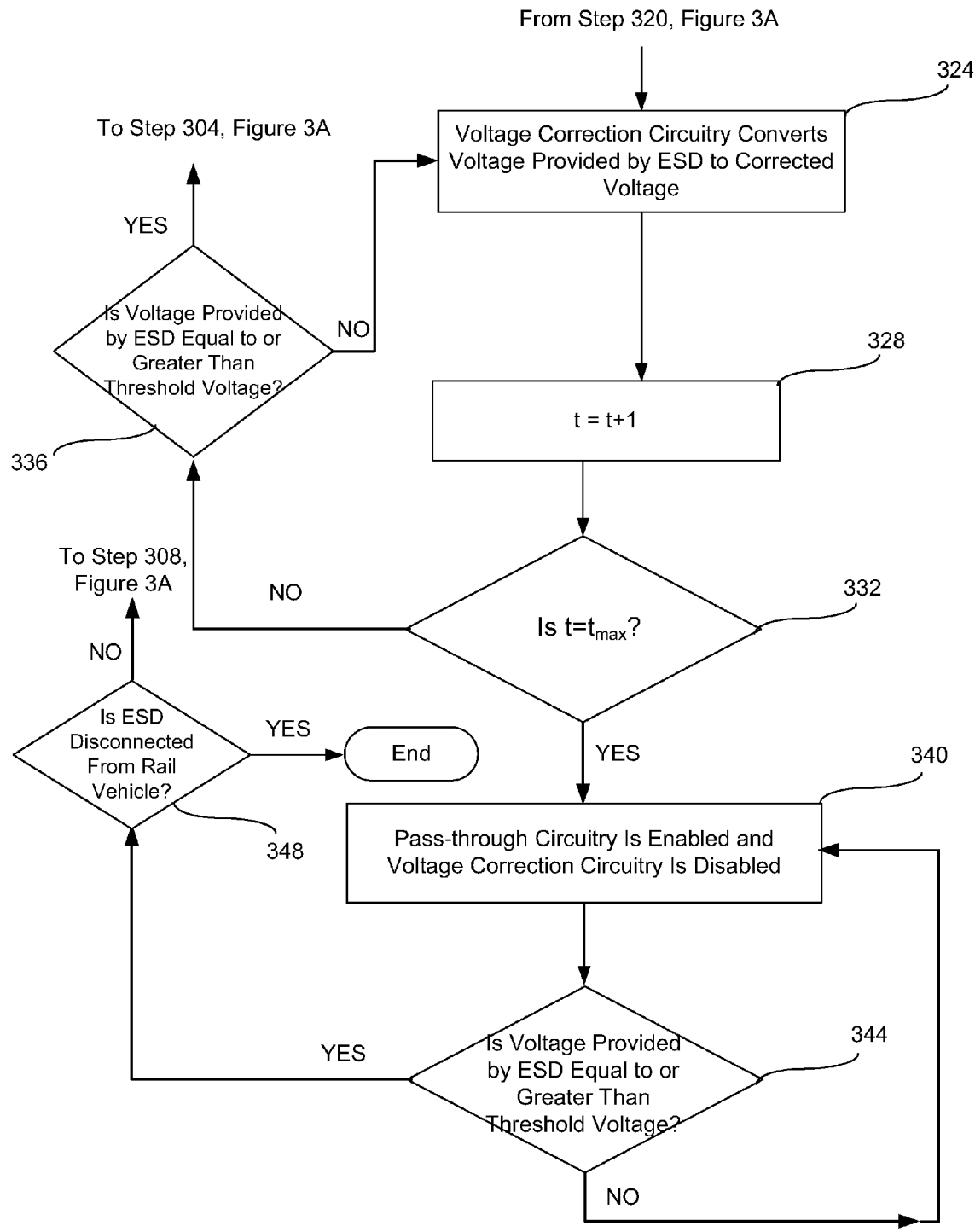

FIG. 3B is an example operational flow diagram of a method for monitoring the voltage provided by an energy storage device and for upconverting the voltage delivered to equipment in accordance with various embodiments.

DETAILED DESCRIPTION

In the following description of the various embodiments, reference is made to the accompanying drawings, which form a part hereof, and in which is shown by way of illustration the various embodiments in which aspects described herein may be practiced. It is to be understood that other embodiments may be utilized and structural and functional modifications may be made without departing from the scope and spirit of the present disclosure.

For example, when starting or cranking an engine of a vehicle, the voltage provided by an energy source, such as an energy storage device, may drop below a minimum voltage. The minimum voltage may be necessary for proper operation of the equipment in the vehicle. In one embodiment, the vehicle may comprise a rail vehicle such as a locomotive in a train consist. When the vehicle comprises a locomotive, the locomotive may be started or cranked while it is in standby mode, for example. In a locomotive, the energy storage device may comprise a battery, for example. A minimum voltage may be required to adequately power the equipment found in the locomotive. The equipment or devices may comprise one or more on-board computing systems resident in the locomotive. When the voltage provided by the energy storage device falls below a minimum voltage (i.e., a threshold voltage), the one or more on-board computing systems, which depend on the voltage provided by the energy storage device for proper operations, may fail to operate normally. For example, a device, such as a data storage device in an on-board computing system, may fail to operate properly when the voltage it relies on falls below the threshold voltage. The voltage drop may result in insufficient power delivered to the data storage device which may affect its operation or performance. As a consequence, the data storage device may malfunction and lead to a loss of data, for example. Other components of the on-board computing system may fail when the voltage these components rely on falls below the minimum voltage or threshold voltage.

A condition known as a brownout may occur when the voltage used for powering the devices falls below the threshold voltage. For example, the voltage may be below but very close to the threshold voltage which may cause one or more devices to enter a "latched up" or "locked up" state (i.e., each of the one or more devices may enter a state in which it is unresponsive to any input). For example, a device may remain in this state until the energy stored in the device is fully discharged. The various aspects of this disclosure may be used to prevent such a brownout occurrence by way of preventing the voltage from decreasing below the threshold voltage.

Described herein are at least a method and a system for monitoring the voltage provided by an energy storage device and for upconverting the voltage to a minimum voltage necessary to adequately power equipment resident in a vehicle such as a locomotive of a train consist. The method and the system may be employed when the voltage provided by an energy storage device is reduced below a threshold voltage. The voltage provided by the energy storage device may be affected when a significant power load is applied to the energy storage device. For example, the voltage provided by a battery in a locomotive may be significantly reduced during a locomotive cranking operation.

FIG. 1 illustrates an example system 100 in which various embodiments may be implemented. In one embodiment, the system 100 may be resident in a rail vehicle, such as a locomotive of a train consist, for example. Therefore, the system 100 may be described as a voltage maintenance system of a locomotive. The system 100 may comprise a pass-through circuitry 108, a controller/comparator circuitry 112, and a voltage correction circuitry 116. The system 100 may be used as an interface between the energy storage device (ESD) 104 and the equipment 120 to regulate the voltage provided by the energy storage device 104 to the equipment 120, as shown. The equipment 120 may comprise any type of equipment resident in a locomotive. The equipment 120 may comprise one or more devices, such as one or more computing devices, appliances, and/or other power consuming devices. For example, the one or more computing devices may comprise a computer and/or network of computers communicatively coupled together by one or more switches and routers. In another example, the one or more computing devices may comprise any type of telecommunications equipment such as radios, receivers, transmitters, and the like. In one embodiment, the energy storage device 104 may comprise any type of battery capable of generating a voltage necessary for powering the locomotive and its equipment 120, for example. The energy storage device 104 may be configured for installation into a rail vehicle, such as a locomotive. In one embodiment, the energy storage device 104 may provide a voltage of 74 volts. In other embodiments, the energy storage device 104 may provide any voltage normally used for powering the equipment 120 shown in connection with FIG. 1. The voltage provided by the energy storage device 104 may be downconverted or transformed into one or more desired voltages to satisfy the required input voltage(s) of the equipment 120 resident in the rail vehicle. The voltage may be downconverted or transformed using a voltage transformer, for example. The downconverted voltages may be distributed throughout the rail vehicle. The voltage provided by the energy storage device 104 and the downconverted voltages may be distributed to equipment in the locomotive and the one or more cars of a train consist, for example.

The pass-through circuitry 108 comprises any type of circuitry configured for selectively conducting current supplied or sourced by the energy storage device 104 when the voltage provided by the ESD 104 is equal to or greater than a minimum voltage or threshold voltage. The pass-through circuitry 108 may selectively conduct current or permit the passage of current from a first terminal located at the input of the pass-through circuitry 108 to a second terminal located at the output of the pass-through circuitry 108 as illustrated in FIG. 1. The pass-through circuitry 108 may selectively conduct current based on control signals it receives from the controller/comparator circuitry 112. The current, of course, may be used to power the equipment 120. Conduction of current or current flow may be enabled or disabled in response to one or more control signals generated by the controller/comparator circuitry 112. The resistance of the pass-through circuitry 108 may be adjusted to allow for current to flow between the energy storage device 104 and the equipment 120. When the resistance or impedance across the pass-through circuitry 108 is low while the resistance or impedance across the voltage correction circuitry 116 and controller/comparator circuitry 112 is high, for example, current may be supplied to the equipment 120 from the energy storage device 104 by way of the pass-through circuitry 108. In one embodiment, the resistance or impedance across the controller/comparator circuitry 112 may be a high value such that current may be selectively switched between the pass-through circuitry 108 and the voltage correction circuitry 116.

In one embodiment, the pass-through circuitry 108 comprises one or more MOSFETs (metal-oxide-semiconductor field-effect transistor). In one embodiment, each of the one or more MOSFETs may comprise an n-channel MOSFET. The one or more MOSFETs may be configured in parallel with the source of each of the one or more MOSFETs connected to the first terminal (as indicated in FIGS. 1 and 2) and the drain of each of the one or more MOSFETs connected to the second terminal (as indicated in FIGS. 1 and 2). The number of MOSFETs used in the parallel configuration may be determined based on the resistance desired across the pass-through circuitry 108. As the number of MOSFETs used increases, the resistance across the pass-through circuitry 108 may decrease. The MOSFETs may be configured such that their respective sources are connected to the first terminal while their respective drains are connected to the second terminal. In one embodiment, the current may be increased by increasing the number of MOSFETs, such as the number of n-channel MOSFETs used in the parallel configuration. In another embodiment, the pass-through circuitry 108 may comprise one or more diodes placed in parallel across the one or more parallel configured MOSFETs. Each of the one or more diodes may have a forward voltage of approximately 0.7 volts. In one embodiment, each of the one or more diodes may comprise a low forward voltage diode. The low forward voltage diode may have a forward voltage of approximately 0.2 volts. Use of a low forward voltage diode may reduce the power dissipation associated with the diode.

The controller/comparator circuitry 112 may be used to control whether the pass-through circuitry 108 provides a low resistance conduction path or a high resistance conduction path between the first terminal to the second terminal. Likewise, the controller/comparator circuitry 112 may be used to control whether the voltage correction circuitry 116 provides a low resistance conduction path or a high resistance conduction path between the first terminal to the second terminal. When the pass-through circuitry 108 provides a high resistance path, the current provided or transmitted through the pass-through circuitry 108 may be minimal or extremely small (close to zero) and the pass-through circuitry 108 may behave or act as an open circuit. Likewise, when the voltage correction circuitry 116 provides a high resistance path, the current provided or transmitted through the voltage correction circuitry 116 may be minimal or extremely small and the voltage correction circuitry 116 may behave or act as an open circuit. When the pass-through circuitry 108, as controlled by the controller/comparator circuitry 112, provides a low resistance, the pass-through circuitry 108 may behave or act as a short circuit allowing the energy storage device 104 to provide current to the equipment 120 by way of the pass-through circuitry 108. Likewise, when the voltage correction circuitry 116, as controlled by the controller/comparator circuitry 112, provides a low resistance, the voltage correction circuitry 116 may behave or act as a short circuit allowing the energy storage device 104 to provide current to the equipment 120 by way of the voltage correction circuitry 116.

The controller/comparator circuitry 112 may control the pass-through circuitry 108 and/or voltage correction circuitry 116 by way of generating and transmitting one or more control signals. In one embodiment, the type of the one or more control signals transmitted to the pass-through circuitry 108 and/or voltage correction circuitry 116 may determine whether the pass-through circuitry 108 and/or voltage correction circuitry 116 behaves as a short circuit or as an open circuit. The controller/comparator circuitry 112 may comprise one or more voltage comparators used to detect when the voltage provided by the energy storage device 104 at the first terminal falls below a certain threshold voltage. The controller/comparator circuitry 112 may provide one or more first control signals when the pass-through circuitry 108 is to be enabled while the voltage correction circuitry 116 is to be disabled. Otherwise, the controller/comparator circuitry 112 may provide one or more second control signals when the pass-through circuitry 108 is to be disabled while the voltage correction circuitry 116 is to be enabled. In one embodiment, the one or more first control signals may be the same as the one or more second control signals. In another embodiment, the one or more first control signals may be different to the one or more second control signals. In one embodiment, the pass-through circuitry 108 conducts current between the energy storage device 104 and the equipment 120 when one or more n-channel MOSFETs are turned on. When the one or more MOSFETs are turned on, the channel resistance between the drain and the source of each of the one or more MOSFETs decreases to a value close to zero resistance (for example, less than or equal to 0.01 ohms) when the gate to source voltages of the one or more MOSFETs reaches or exceeds a certain turn-on voltage. Thus, in this instance, the pass-through circuitry 108 behaves as a short circuit. Each MOSFET of the one or more n-channel MOSFETs may be turned on when the voltage at the gate of the MOSFET exceeds a turn on voltage.

The controller/comparator circuitry 112 may comprise a timer for measuring the amount of time that has elapsed after a change of state has occurred for the pass-through circuitry 108 and/or the voltage converter circuitry 116. For example, the timer may determine the duration of time the voltage converter circuitry 116 has been enabled or turned to its "ON" state. Similarly, the timer may determine the duration of time the pass-through circuitry 108 has been enabled or turned to its "ON" state while the voltage converter circuitry 116 has been disabled or turned to its "OFF" state. Thus, the controller/comparator circuitry 112 may measure the duration of time the voltage converter circuitry 116 and/or pass-through circuitry 108 has been in a particular state. In one embodiment, the controller/comparator circuitry 112 may comprise one or more comparators implemented using operational amplifiers. Each of the one or more operational amplifiers may generate one or more digital control signals in response to the voltage at its input. The one or more operational amplifiers may employ hysteresis for stabilizing the output in the presence of noise.

In one embodiment, the controller/comparator circuitry 112 may comprise a processor capable of executing software or a computer program comprising computer-executable instructions stored in a memory for causing the controller/comparator circuitry 112 to measure the amount of time that has elapsed after a change of state has occurred for the pass-through circuitry 108 and/or the voltage converter circuitry 116. In one embodiment, as an alternative to using one or more comparators, the processor may be used to execute the computer-executable instructions stored in the memory to perform functions provided by the one or more comparators. It should be understood that the processor may comprise multiple processors and that the multiple processors may be distributed over a network.

The controller/comparator circuitry 112 may comprise a counter for counting the number of instances in which the voltage correction circuitry has been enabled or turned to its "ON" state. The value of the counter may be used as a parameter to determine whether the ESD 104 or the equipment 120 is properly functioning. A rate of occurrence of a voltage correction event per locomotive cranking event may be used to determine whether the ESD 104 or equipment 120 is properly functioning.

The voltage correction circuitry 116 comprises any circuitry capable of upconverting a voltage at its input to a desired higher voltage at its output. For example, if the voltage provided by the energy storage device 104 is less than the desired voltage required by equipment 120 for normal operation in a locomotive, the voltage correction circuitry 116 may convert the voltage to a higher voltage. In one embodiment, the voltage correction circuitry 116 converts a lower DC (direct current) voltage to a higher DC voltage. In one embodiment, the voltage correction circuitry 116 may comprise one or more voltage converters. For example, the voltage correction circuitry 116 may comprise a series of converters comprising a number of stages. Each stage may be identical and may be synchronized to a clock that has phase shifted outputs. In one embodiment, the voltage correction circuitry 116 may comprise eight stages in which each stage is designed to be phase shifted by 45 degrees. Circuitry may be used to implement eight different clock signals for each of the eight voltage converter stages. In one embodiment, each of the eight clock signals may be phase shifted by 45 degrees relative to each other. Each of the eight clock signals may be used to clock each stage of an eight stage converter. The eight clock signals may be generated from a common clock source, thereby synchronizing the stages to reduce electromagnetic interference (EMI). The use of multiple converter stages may allow each converter stage to operate cooler and longer for the same current output. Phase shifting the operation of each stage may reduce the amount of capacitance required at the input of the multiple converter stages because each stage will draw its peak current at different intervals. As a consequence, the required capacitance may be lowered for a capacitor used at the input of the voltage correction circuitry 116. Furthermore, the use of multiple stages in the voltage converter circuitry 116 provides redundancy which may allow for single stage failure with only a slight degradation in voltage conversion performance.

After the voltage correction circuitry 116 upconverts a voltage, the voltage correction circuitry 116 may provide current at the corrected voltage to the equipment 120, thereby providing power to the equipment at the upconverted voltage. When the voltage correction circuitry 116 is selectively enabled to provide the current at the corrected voltage to the equipment 120, the voltage correction circuitry 116 may be configured to behave as a short circuit and the voltage correction circuitry 116 may have a low resistance.

In one embodiment, the controller/comparator circuitry 112 may control the pass-through circuitry 108 and voltage correction circuitry 116 by way of transmitting one or more first control signals to the pass-through circuitry 108 and one or more second control signals to the voltage correction circuitry 116. The one or more first control signals transmitted to the pass-through circuitry 108 may determine whether the pass-through circuitry is enabled to allow current to flow from the ESD 104 to the equipment 120. The one or more second control signals transmitted to the voltage correction circuitry 116 may determine whether the voltage correction circuitry 116 converts the voltage at its input to one or more desired voltages and provides an associated current of the one or more converted voltages to the equipment 120. In one embodiment, the one or more first control signals transmitted to the pass-through circuitry 108 and the one or more second control signals transmitted to the voltage correction circuitry 116 may be sent simultaneously to insure that appropriate state changes occur to both the pass-through circuitry 108 and the voltage correction circuitry 116 at the same time. In one embodiment, the one or more first control signals and second control signals are used to enable a conductive path (for current to flow from the energy storage device 104 to the equipment 120) through either the pass-through circuitry 108 or the voltage correction circuitry 116. For example, the one or more first control signals and the one or more second control signals may be used to disable the voltage correction circuitry 116 and enable the pass-through circuitry 108. Furthermore, for example, the one or more first control signals and the one or more second control signals may be used to enable the voltage correction circuitry 116 and disable the pass-through circuitry 108. As an example of a control signal, a binary one digital signal (or high valued signal of two signal values) may be used as the control signal by the controller/comparator circuitry 112 to either enable the pass-through circuitry 108 or the voltage correction circuitry 116. Likewise, for example, a binary zero digital signal (or low valued signal of two signal values) may be used as a control signal by the controller/comparator circuitry 112 to either disable the pass-through circuitry 108 or the voltage correction circuitry 116.

FIG. 2 illustrates an example system 200 in which various embodiments may be implemented. The system 200 may be located within a locomotive of a train consist, for example. The system 200 may be incorporated into a rail vehicle. The system may comprise a pass-through circuitry 208, a controller/comparator circuitry 212, a voltage correction circuitry 216, and a fault detection circuitry 224. The system 200 may be used as an interface to regulate the voltage provided by the energy storage device (ESD) 204 to equipment 220, as shown. Each of the pass-through circuitry 208, a controller/comparator circuitry 212, a voltage correction circuitry 216, may correspond to the pass-through circuitry 108, the controller/comparator circuitry 112, and the voltage correction circuitry 116, respectively, as was previously described in connection with FIG. 1. The energy storage device 204 may comprise the energy storage device 104 that was previously described in connection with FIG. 1. The equipment 220 may comprise the equipment 120 previously described in connection with FIG. 1. The fault detection circuitry 224 may comprise any type of circuitry for monitoring the voltage difference between the input and output of the pass-through circuitry 208 (i.e., between the first and second terminals, as indicated in FIG. 2). The fault detection circuitry 224 may be used to determine whether the voltage difference across the first and second terminals falls outside the normal range of acceptable voltage differences. The voltage difference measured across the first and second terminals may be used to determine if the pass-through circuitry 208 is functioning or operating correctly. When the fault detection circuitry 224 determines that the voltage difference measured across the first and second terminals is outside of an acceptable range, an alert may be generated indicating that the system 200 should be examined or serviced. The alert may comprise a message such as an e-mail message, a visual notification, and/or an audible notification transmitted by the system 200.

FIGS. 3A and 3B are example operational flow diagrams of a method for monitoring the voltage provided by an energy storage device 104, 204 and for upconverting the voltage delivered to equipment 120, 220 in accordance with various embodiments. The energy storage device 104, 204 and equipment 120, 220 may be resident in a locomotive of a train consist, for example. The steps or processes associated with the operational flow diagrams of FIGS. 3A and 3B may be implemented, for example, using one or more aspects of the systems 100, 200 described in connection with FIGS. 1 and 2.

At step 304, the system 100, 200, as described in connection with either of FIGS. 1 and 2, may be initialized by way of enabling the pass-through circuitry 108, 208 to its "ON" state. When enabled, the pass-through circuitry 108, 208 allows current to flow from the first terminal to the second terminal of the system 100, 200 described in connection with FIGS. 1 and 2. Optionally, during initialization, the voltage correction circuitry 116, 216 illustrated in each of FIGS. 1 and 2 may be enabled and disabled to test its operation. During the initialization test, a voltage less than the threshold voltage may be input into the voltage correction circuitry 116, 216 as a way to verify its upconversion functionality. The controller/comparator circuitry 112, 212 may transmit one or more first control signals to the pass-through circuitry 108, 208 and one or more second control signals to the voltage correction circuitry 116, 216 to enable the pass-through circuitry 108, 208 and to disable the voltage correction circuitry 116, 216. This allows current to flow from the energy storage device 104, 204 to the equipment 120, 220 through the pass-through circuitry 108, 208.

Next, at step 308, the controller/comparator circuitry 112, 212 may monitor the voltage supplied by the energy storage device 104, 204 to the system 100, 200 at the first terminal. The first terminal corresponds to the input of the system 100, 200 described and shown in connection with each of FIGS. 1 and 2. The controller/comparator circuitry 112, 212 may be configured to continuously or periodically measure and/or monitor the voltage provided by the energy storage device 104, 204.

At step 312, the controller/comparator circuitry 112, 212 may determine whether the voltage provided by the energy storage device 104, 204 is less than a threshold voltage. The controller/comparator circuitry 112, 212 may determine whether the voltage is less than the threshold voltage by way of using one or more comparators. The threshold voltage may correspond to a minimum voltage used by the equipment 120, 220 to allow for normal functioning or operation of the equipment 120, 220. The threshold voltage may be determined and programmed into a memory of the controller/comparator circuitry 112, 212. The memory may comprise a non-volatile memory. An engineer or other person may input the threshold voltage value into the memory of the controller/comparator circuitry 112, 212 by way of an input interface, for example. Any type of circuitry may be used to generate the desired threshold voltage based on the value provided by the engineer. For example, one or more electronic components, such as a digital potentiometer, may be used to generate the desired threshold voltage. The digital potentiometer may be gradually adjusted to output the desired threshold voltage. In one embodiment, the threshold voltage may be equal to 52 volts. If the voltage provided by the energy storage device 104, 204 is not less than the threshold voltage, the process reverts back to step 308 in which the controller/comparator circuitry 112, 212 continues to measure and/or monitor the voltage provided by the energy storage device 104, 204. If the voltage provided by the energy storage device 104, 204 is less than the threshold voltage, the process continues to step 316.

At step 316, a timer may be initialized to measure the duration of time in which the voltage provided by the ESD 104, 204 is below the threshold voltage. In one embodiment, the controller/comparator circuitry 112, 212 may comprise the timer. In another embodiment, the timer may be implemented within the system 100, 200 but outside of the controller/comparator circuitry 112, 212. The timer may be initialized by resetting the timer to zero (i.e., t=0). The timer may start counting from time, t=0.

At approximately the same time in which the timer is initialized, a counter, that counts the number of voltage correction occurrences performed by the voltage correction circuitry 116, 216, may be incremented to monitor the number of occurrences or instances in which the voltage provided by the ESD 104, 204 has dropped below the threshold voltage and the voltage correction circuitry 116, 216 has been enabled. This counter may be referred to as a voltage correction occurrence counter. The ratio of the number of such voltage correction occurrences to a number of cranking events may provide an indication of the condition of the ESD 104, 204. For example, when the ratio exceeds a certain fraction or percentage, an alert may be generated to have the ESD 104, 204 evaluated, tested, and determined if it needs to be replaced. Furthermore, for example, when the ratio exceeds the certain percentage, the alert may signify that other issues have occurred, such as unexpected power consumption at the equipment 120, 220, for example. The controller/comparator circuitry 112, 212 may comprise the voltage correction occurrence counter. In one embodiment, the voltage correction occurrence counter may be implemented within the system 100, 200 but outside of the controller/comparator circuitry 112, 212. The voltage correction occurrence counter may be initialized by resetting the voltage correction occurrence counter to zero. In one embodiment, the voltage correction occurrence counter may be reset based on a set of rules. The set of rules may be based on a calendar date, a predefined maximum count value, a locomotive mileage, and/or a locomotive run time. The voltage correction occurrence counter may be reset to zero automatically as determined by the set of rules. Alternatively, the voltage correction occurrence counter may be reset to zero manually by a user. In one embodiment, the voltage correction occurrence counter may be prevented from being reset until the ratio is reduced to a percentage that is lower than that of the certain fraction or percentage.

Next, at step 320, at the same time the timer is set to t=0, the controller/comparator circuitry 112, 212 may transmit one or more first control signals and one or more second control signals to configure the pass-through circuitry 108, 208 to its "OFF" or disabled state and to configure the voltage correction circuitry 116, 216 to its "ON" or enabled state. In its "OFF" or disabled state, the pass-through circuitry 108, 208 behaves like an open circuit to prevent current flow between the energy storage device 104, 204 and the equipment 120, 220. The controller/comparator circuitry 112, 212 may reset the timer when the voltage correction circuitry 116, 216 is configured to its "ON" or enabled state.

At step 324 of FIG. 3B, the voltage correction circuitry 116, 216 converts the voltage provided by the energy storage device 104, 204 to the corrected or desired voltage and facilitates current flow between the energy storage device 104, 204 and the equipment 120, 220. Thus, the voltage correction circuitry 108, 208 provides power to the equipment 120, 220 at the desired upconverted voltage. The corrected or desired voltage may comprise the minimum voltage for properly operating the equipment 120, 220 located in the locomotive. In one embodiment, the corrected or desired voltage may be equal to the threshold voltage. In another embodiment, the corrected or desired voltage may be higher than the threshold voltage. For example, when the voltage provided by the energy storage device 104, 204 falls below a threshold voltage of 52V, the voltage correction circuitry 116, 216 may upconvert the voltage to a value equal to or higher than 52V.

Next, at step 328, the timer increments time by one unit. In one embodiment, the incremental unit of time comprises one second although the time unit may comprise any fraction of a second. The timer may be used to determine the amount of time that has elapsed after the voltage correction circuitry is enabled or turned to its "ON" state.

Thereafter, at step 332, a decision is made based on whether the time, t, as measured by the timer, has reached a particular value, $t_{max}$. The value for $t_{max}$ may be determined based on the expected maximum amount of time the voltage correction circuitry 116, 216 can effectively convert the voltage provided by the energy storage device 104, 204 to the corrected or desired voltage. The value for $t_{max}$ may be based on the difference between the desired or corrected voltage and the actual voltage generated by the energy storage device 104, 204. As the difference increases, the value for $t_{max}$ may decrease, for example. In one embodiment, the desired voltage may comprise the threshold voltage. The threshold voltage, for example, may comprise 52V. In another embodiment, the value for $t_{max}$ may be based on an estimated maximum duration of a cranking operation. Yet, in another embodiment, the value for $t_{max}$ may be based on the maximum energy allowed to be dissipated by the voltage correction circuitry 116, 216 while it is in its enabled or "ON" state. In one embodiment, an engineer or other person may input the value for $t_{max}$ into the timer by way of an input interface, for example. In one embodiment, the value for $t_{max}$ may be determined automatically by way of using an algorithm. If the value for t has reached $t_{max}$, the process proceeds with step 340. Otherwise, the process proceeds with step 336.

At step 336, a decision is made based on whether the voltage provided by the energy storage device 104, 204 is equal to or greater than the threshold voltage. If the voltage provided by the energy storage device 104, 204 is not greater than or equal to the threshold voltage, the process proceeds with step 324. Otherwise, the process reverts back to step 304.

At step 340, the pass-through circuitry 108, 208 is enabled or switched to its "ON" state and the voltage correction circuitry 116, 216 is disabled. The controller/comparator circuitry 112, 212 may transmit one or more first control signals and one or more second control signals to configure the pass-through circuitry 108, 208 to its "ON" or enabled state and to configure the voltage correction circuitry 116, 216 to its "OFF" or disabled state. Since the voltage provided by the energy storage device 104, 204 has not reached the corrected or desired voltage and the voltage correction circuitry 116, 216 has been operating for duration of time, $t_{max}$, the power consumption associated with the voltage correction circuitry 116, 216 may be halted by disabling the voltage correction circuitry 116, 216. The voltage correction circuitry 116, 216 may be disabled to prevent further power dissipation from occurring beyond the value of $t_{max}$.

Next, at step 344, the voltage provided by the energy storage device 104, 204 is monitored and a decision is made based on whether the voltage provided by the energy storage device 104, 204 is equal to or greater than the threshold voltage. If the voltage provided by the energy storage device 104, 204 is equal to or greater than the threshold voltage, the process continues to step 348. If the voltage provided by the energy storage device 104, 204 is equal to or greater than the threshold voltage, the timer is reset to zero. Otherwise, the process reverts back to step 340 where the pass-through circuitry may be maintained in its enabled or "ON" state and the voltage correction circuitry 116, 216 may be maintained in its disabled or "OFF" state. In one embodiment, the controller/comparator circuitry 112, 212 may continue to transmit one or more first control signals and one or more second control signals to maintain the pass-through circuitry 108, 208 in its "ON" or enabled state and to maintain the voltage correction circuitry 116, 216 in its "OFF" or disabled state. In another embodiment, the controller/comparator circuitry 112, 212 may not send any control signals until a state change is to occur. The process may continue to revert back to step 340 over time until the voltage provided by the energy storage device 104, 204 is equal to or greater than the threshold voltage. The process may cycle between steps 340 and 344 over some duration of time until it is determined that the voltage supplied by the ESD 104, 204 is greater than the threshold voltage. When the process enters steps 340 and 344 (i.e, when $t=t_{max}$), an alert, such as a visible signal or message, a text message, or an audible signal may be generated by the system 100, 200 to indicate that a cranking operation has abnormally exceeded an estimated maximum duration. The alert may be automatically transmitted to an engineer or maintenance person so that the condition may be evaluated and corrected.

Next, at step 348, the controller/comparator circuitry 112, 212 may determine whether the energy storage device (ESD) 104, 204 is disconnected from the rail vehicle. The controller/comparator circuitry 112, 212 may monitor and determine that the voltage across the ESD 104, 214 has decreased below a minimum threshold value that signifies that the ESD 104, 204 has been disconnected from the system 100, 200. The minimum threshold value may be set to a value close to zero, for example. When the vehicle comprises a locomotive, for example, the ESD 104, 204 may be disconnected from the locomotive when the locomotive is undergoing maintenance at a rail yard. If the controller/comparator circuitry 112, 212 determines that the ESD 104, 204 is disconnected from the rail vehicle, the process ends. Otherwise, the process reverts back to step 308.

The various aspects of the disclosure may be used with any type of power management and distribution system. The system and/or methods described in connection with FIGS. 1, 2, 3AB may be connected and/or communicatively coupled to the power management and distribution system. In one embodiment, the equipment 120, 220 comprises the power management and distribution system. The power management and distribution system may comprise logic circuitry that controls the shut off or powering down of the equipment 120, 220. The shut off or powering down may be performed by the logic circuitry of the power management and distribution system in a sequential fashion based on a prioritized basis. A device may be shut down or powered down earlier than one or more other devices based on one or more of the following criteria: operational importance, power consumption, and functionality, for example.

The various aspects described herein may be embodied as a method, a system or apparatus, one or more computer systems, and/or as a computer-readable storage media for storing software or a computer program comprising computer-executable instructions that are capable of being executed by at least one processor resident in the one or more computer systems. The computer-readable storage media may comprise any type of memory such as a hard disk drive, optical disk, and/or flash memory, for example. Accordingly, these aspects may take the form of an entirely hardware embodiment, an entirely software embodiment, or an embodiment combining software and hardware aspects.

Aspects of the disclosure have been described in terms of illustrative embodiments thereof. It is contemplated that the embodiments described herein are susceptible to many modifications of form, arrangement, of parts, details and order of operation and that there are numerous other embodiments, modifications, and variations of the disclosure that fall within the scope and spirit of the disclosure from a review of this entire disclosure. Furthermore, for example, the one or more steps illustrated in the illustrative figures may be performed in other than the recited order, and that the one or more steps illustrated may be optional in accordance with aspects of the disclosure. While some embodiments have been described with respect to specific examples, other embodiments include numerous variations and permutations of the above described systems and techniques.

Although the subject matter has been described in language specific to structural features and/or methodological acts, it is to be understood that the subject matter defined in the appended claims is not necessarily limited to the specific embodiments and/or features described above. Rather, the specific embodiments and/or features described above are disclosed as illustrative forms of implementing the claims.

What is claimed is:

1. A system comprising:
   a rail vehicle comprising:
      a first circuitry configured for generating one or more control signals based on a voltage provided by an energy storage device;
      a second circuitry configured for:
         receiving said one or more control signals; and
         first providing current sourced by said energy storage device through said second circuitry to power one or more devices, said first providing performed when said one or more control signals enables said second circuitry;

a third circuitry configured for:
  receiving said one or more control signals;
  upconverting said voltage from a first value to a second value, and
  second providing said current through said third circuitry to power said one or more devices, said upconverting and said second providing performed when said one or more control signals enables said third circuitry; and
a timer for measuring a duration of said upconverting, wherein said one or more control signals are configured to selectively enable said second circuitry when said voltage is equal to or greater than a threshold value, and said third circuitry when said voltage is less than said threshold value, and
wherein said rail vehicle is configured to: count a number of occurrences in which said voltage has dropped below said threshold value and said third circuitry has been enabled, compute a ratio of said number of occurrences to a number of cranking events, determine whether said ratio exceeds a certain percentage, and generate an alert that said energy storage device should be evaluated when said ratio exceeds said certain percentage.

2. The system of claim 1 wherein said rail vehicle comprises a locomotive.

3. The system of claim 1 wherein said second value equals said threshold value.

4. The system of claim 1 wherein said upconverting is performed for a period of time.

5. The system of claim 4 wherein said period of time corresponds to an estimated maximum duration of a cranking operation of said rail vehicle.

6. The system of claim 4 wherein an alert is generated at the end of said period of time.

7. The system of claim 1 wherein said second circuitry comprises one or more metal oxide field effect transistors (MOSFETs).

8. The system of claim 1 further comprising a fourth circuitry for monitoring a voltage difference across said second circuitry.

9. The system of claim 8 wherein an alert is generated when said voltage difference across said second circuitry falls outside a normal range of acceptable values.

10. The system of claim 1 wherein said energy storage device comprises a battery.

11. A method comprising: generating one or more control signals by a first circuitry based on a voltage provided by an energy storage device of a rail vehicle; first receiving a first subset of said one or more control signals by a second circuitry; second receiving a second subset of said one or more control signals by a third circuitry; using said one or more control signals to selectively enable said second circuitry when said voltage is equal to or greater than a threshold value, and said third circuitry when said voltage is less than said threshold value; generating a low resistance conduction path across said second circuitry and a high resistance path across said third circuitry and passing current from said energy storage device to one or more devices through said second circuitry when said second circuitry is enabled and said third circuitry is disabled; generating a low resistance conduction path across said third circuitry and a high resistance path across said second circuitry, upconverting said voltage from a first value to a second value, and passing current from said energy storage device to said one or more devices through said third circuitry when said third circuitry is enabled and said second circuitry is disabled; measuring a duration of said upconverting; counting a number of occurrences in which said voltage is less than said threshold value and said third circuitry has been enabled; computing a ratio of said number of occurrences to a number of cranking events; determining whether said ratio exceeds a certain percentage; and generating an alert that said energy storage device should be evaluated when said ratio exceeds said certain percentage, wherein said rail vehicle comprises said first, second, and third circuitries.

12. The method of claim 11 wherein said rail vehicle comprises a locomotive.

13. The method of claim 11 wherein said second value equals said threshold value.

14. The method of claim 11 wherein said upconverting is performed for a period of time.

15. The method of claim 14 wherein said period of time corresponds to an estimated maximum duration of a cranking operation of said rail vehicle.

16. The method of claim 14 wherein an alert is generated at the end of said period of time.

17. The method of claim 11 wherein said second circuitry comprises one or more metal oxide field effect transistors (MOSFETs).

18. The method of claim 11 further comprising monitoring a voltage difference across said second circuitry by way of a fourth circuitry.

19. The method of claim 18 further comprising generating an alert when said voltage difference across said second circuitry falls outside a normal range of acceptable values.

20. A system comprising: a rail vehicle comprising: two or more circuitries operable for, at least: generating one or more control signals based on a voltage provided by an energy storage device; based on said one or more control signals, selectively enabling a flow of current through a first circuitry of said two or more circuitries when said voltage is equal to or greater than a threshold value, and a second circuitry of said two or more circuitries when said voltage is less than said threshold value, wherein said flow of said current through said second circuitry upconverts said voltage from a first value to a second value, said voltage associated with said current; measuring a duration of time in which said second circuitry upconverts said voltage; counting a number of occurrences in which said voltage is less than said threshold value and said second circuitry has been enabled; computing a ratio of said number of occurrences to a number of cranking events; determining whether said ratio exceeds a certain percentage; and generating an alert that said energy storage device should be evaluated when said ratio exceeds said certain percentage.

21. The system of claim 1 wherein said upconverting is performed for a period of time based on an expected maximum amount of time said third circuitry can convert said voltage provided by said energy storage device to said second value.

22. The system of claim 1 wherein said upconverting is performed for a period of time based on a difference between said second value and said first value.

23. The system of claim 1 wherein said upconverting is performed for a period of time based on a maximum energy allowed to be dissipated by said third circuitry while said third circuitry is enabled.

24. The system of claim 23 wherein said third circuitry is disabled when said period of time is reached.

25. The method of claim 17 wherein said low resistance conduction path of said second circuitry is generated by turning on each of said one or more MOSFETs by way of exceeding a turn-on voltage of each of the gate to source voltages of said one or more MOSFETs.

26. The system of claim 1 wherein said third circuitry comprises:
   a plurality of voltage converter stages, wherein each of said plurality of voltage converter stages is synchronized to a corresponding clock of a plurality of clocks, and wherein each of said plurality of clocks is phase shifted relative to each other.

* * * * *